United States Patent [19]
McClelland

[11] Patent Number: 6,093,993
[45] Date of Patent: Jul. 25, 2000

[54] SET OF LAMINATIONS FOR A SWITCHED RELUCTANCE MACHINE

[75] Inventor: Michael Leo McClelland, Leeds, United Kingdom

[73] Assignee: Switched Relutance Drives Limited, Harrogate, United Kingdom

[21] Appl. No.: 09/311,676

[22] Filed: May 13, 1999

[30] Foreign Application Priority Data

May 14, 1998 [GB] United Kingdom ............... 9810418

[51] Int. Cl.[7] ............................................. H02K 17/42
[52] U.S. Cl. ........................... 310/168; 310/216; 310/269
[58] Field of Search ..................... 310/216, 168, 310/159, 166, 167, 261, 254, 269, 185; 318/701

[56] References Cited

U.S. PATENT DOCUMENTS

| | | | |
|---|---|---|---|
| 606,863 | 7/1898 | Gutmann | 310/168 |
| 2,630,561 | 3/1953 | Mueller | 336/135 |
| 3,041,486 | 7/1962 | Moffitt | 310/168 |
| 3,641,467 | 2/1972 | Ringland et al. | 336/5 |
| 4,048,531 | 9/1977 | Buess et al. | 310/49 R |
| 4,186,316 | 1/1980 | Singh | 310/49 R |
| 4,631,510 | 12/1986 | Nagarkatti et al. | 336/135 |
| 4,647,802 | 3/1987 | Konecny | 310/49 R |
| 4,698,537 | 10/1987 | Byrne et al. | 310/168 |
| 5,146,127 | 9/1992 | Smith | 310/166 |
| 5,148,090 | 9/1992 | Oku et al. | 318/107 |
| 5,220,228 | 6/1993 | Sibata | 310/254 |
| 5,233,254 | 8/1993 | Fisher et al. | 310/261 |
| 5,239,217 | 8/1993 | Horst | 310/51 |
| 5,319,297 | 6/1994 | Bahn | 318/701 |
| 5,418,415 | 5/1995 | Ishizaki | 310/162 |
| 5,428,257 | 6/1995 | Lurkens | 310/168 |
| 5,559,386 | 9/1996 | Gurrieri | 310/211 |
| 5,619,113 | 4/1997 | Bahn | 318/701 |
| 5,668,430 | 9/1997 | Kolomeitsev | 310/266 |
| 5,844,346 | 12/1998 | Kolomeitsev et al. | 310/254 |

FOREIGN PATENT DOCUMENTS

| | | |
|---|---|---|
| 0 528 750 A2 | 2/1993 | European Pat. Off. . |
| 0 573 198 B1 | 11/1996 | European Pat. Off. . |
| 0 763 883 A2 | 3/1997 | European Pat. Off. . |
| 0 795 949 A1 | 9/1997 | European Pat. Off. . |
| 3008937A1 | 9/1981 | Germany . |
| 4213372A1 | 10/1993 | Germany . |
| 2 246 481 | 3/1995 | United Kingdom . |
| WO 97/39512 | 10/1997 | WIPO . |

OTHER PUBLICATIONS

Miller, Tim, "Small Motor Drives Expand Their Technology Horizons", Power Engineering Journal, Sep. 1987, pp. 283–289.

"Variable–Speed Switched Reluctance Motors", by P.J. Lawrenson et al., IEE Proc., vol. 127, Pt. B., No. 4, Jul. 1980, pp. 253–266.

(List continued on next page.)

Primary Examiner—Nestor Ramirez
Assistant Examiner—Joseph Waks
Attorney, Agent, or Firm—Patterson & Keough, P.A.

[57] ABSTRACT

A switched reluctance machine has a stator or rotor lamination with pole arcs that are wider than necessary to fulfill the starting requirement of producing torque in the required direction at every rotor angle. On this lamination, preferably the rotor lamination, the surface is continuously graded over the entire pole pitch so that the first derivative of air gap length with angle is continuous. This allows control of the harmonics in the torque/angle curve and enables the production of smooth torque as the rotor rotates.

20 Claims, 14 Drawing Sheets

OTHER PUBLICATIONS

"Influence of Stator Geometry Upon Vibratory Behaviour and Electromagnetic Performances of Switched Reluctance Motors", by C. Picod et al, 8th International Conference on Electrical Machines and Drives, EMD97 Sep. 1–3, 1997, Conference Publication No. 444, pp. 69–73.

"Analysis and Reduction of Vibration and Acoustic Noise in Switched Reluctance Drives", by C.Y. Wu et al., IEEE Conference, Oct. 2–8, 1993, pp. 106–113.

"Impact of Pole Tapering on the Electromagnetic Torque of the Switched Reluctance Motor", by C. Neagoe et al., IEEE International Electrical Machines Conference Record, May 1997, Milwaukee, Wisconsin Paper WA1–2.1–2.3.

"The Influence of the Rotor Pole Shape on the Static and Dynamic Characteristics of the Switched Reluctance Motor", by A. Pelikant et al., IEEE Tranactions on Magnets, vol. 32, No. 3, May 1996, pp. 1529–1532.

"Poles Arcs Selection of Switched Reluctance Motor", by Wu Jianhua et al., Proceedings of International Conference on Electrical Machines in Adelaide, Australia, vol. 3, Dec. 1993, pp. 571–576.

"Effect of Rotor Profiles on the Torque of a Switched Reluctance Motor", by M. Moallem et al., IEEE Transactions on Industry Applications, vol. 28, No. 2, Mar./Apr. 1992, pp. 571–576.

"The Characteristics, Design and Applications of Switched Relutance Motors and Drves", by Dr. J.M. Stephenson, et al., Seminar 5, PCIM '93 Conference & Exhibition in Nurnberg, Germany, Jun. 21–24, 1993, pp. 1–68.

"Computer–Optimised Current Waveforms for Switched–Reluctance Motors", by H.C. Lovatt et al., IEE Proc.–Electr. Power Appl., vol, 141, No. 2, March 1994, pp. 45–51.

"CEE 548 Theory & Design of Sychronous Machines", by A.L. Jokl, Department of Electrical Engineering, The Catholic University of America, Spring Semester 1993, pp. 1–2.

SET OF LAMINATIONS FOR A SWITCHED RELUCTANCE MACHINE

BACKGROUND OF THE INVENTION

1. Field of the Invention

The present invention relates to a set of laminations for a switched reluctance machine. In particular, this invention relates to a switched reluctance machine in which torque ripple is reduced.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. In one type of reluctance machine, the energization of the phase windings occurs at a controlled frequency. This is generally referred to as a synchronous reluctance machine, and it may be operated as a motor or a generator. In a second type of reluctance machine, circuitry is provided for detecting the angular position of the rotor and energizing the phase windings as a function of the rotor position. This is generally known as a switched reluctance machine and it may also be a motor or a generator. The characteristics of such switched reluctance machines are well known and are described in, for example, "The Characteristics, Design and Application of Switched Reluctance Motors and Drives" by Stephenson and Blake, PCIM '93, Nürnberg, Jun. 21–24 1993, which is incorporated herein by reference. Embodiments of the present invention are generally applicable to switched reluctance machines operating as motors or generators.

FIG. 1 shows the principal components of a typical switched reluctance drive system. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals corresponding to the angular position of the rotor. The output of the rotor position detector 15 may also be used to generate a speed feedback signal.

The rotor position detector 15 may take many forms, for example it may take the form of hardware, as shown schematically in FIG. 1, or of a software algorithm which calculates the position from other monitored parameters of the drive system, as described in European Patent Application No. 0573198, which is incorporated herein by reference. In some systems, the rotor position detector 15 can comprise a rotor position transducer that provides output signals that change state each time the rotor rotates to a position where a different switching arrangement of the devices in the power converter 13 is required.

The energization of the phase windings in a switched reluctance machine depends on detection of the angular position of the rotor. This may be explained by reference to FIGS. 2 and 3, which illustrate the switching of a reluctance machine operating as a motor. FIG. 2 generally shows a rotor pole 20 approaching a stator pole 21 according to arrow 22. As illustrated in FIG. 2, a portion 23 of a complete phase winding 16 is wound around the stator pole 21. As discussed above, when the portion of the phase winding 16 around stator pole 21 is energized, a force will be exerted on the rotor, tending to pull rotor pole 20 into alignment with stator pole 21. The pole faces of both rotor and stator poles are defined by arcs having their centers on the rotational axis of the rotor. The angular extent of these arcs is a matter of choice by the designer. It will be recognized by those skilled in the art that, as a consequence of the arcuate pole faces, the radial distance between the overlapping pole faces, measured along a radius from the rotational axis, is constant over the angular extent of the air gap.

FIG. 3 shows typical switching circuitry in the power converter 13 that controls the energization of the phase winding 16, including the portion 23 around stator pole 21. In this circuit, a switch 31 is connected between the positive terminal of a power supply and one end of the winding 16. Connected between the other end of the winding 16 and the negative terminal of the power supply is another switch 32. Between one end of the winding 16 and the switch 32 is connected one end of a diode 33, the other end of which is connected to the positive terminal of the power supply. Between the winding 16 and switch 31 is connected one end of another diode 34, which is connected at its other end to the negative terminal of the voltage supply. Switches 31 and 32 act to couple and decouple the phase winding 16 to the source of DC power, so that the winding 16 can be energized or de-energized. Many other configurations of switching circuitry are known in the art, some of which are discussed in the Stephenson & Blake paper cited above.

In general, the phase winding is energized to effect the rotation of the rotor as follows. At a first angular position of the rotor (called the "turn-on angle", $\theta_{ON}$), the controller 14 provides switching signals to turn on both switching devices 31 and 32. When the switching devices 31 and 32 are on, the phase winding 16 is coupled to the DC bus, causing an increasing magnetic flux to be established in the machine. The magnetic flux produces a magnetic field in the air gap which acts on the rotor poles to produce the motoring torque. The magnetic flux in the machine is supported by the magneto-motive force (mmf) which is provided by a current flowing from the DC supply through the switches 31 and 32 and the phase winding 16. In some controllers, current feedback is employed and the magnitude of the phase current is controlled by chopping the current by rapidly switching one or both of switching devices 31 and/or 32 on and off. FIG. 4(a) shows a typical current waveform in the chopping mode of operation, where the current is chopped between two fixed levels. In motoring operation, the turn-on angle $\theta_{ON}$ is often chosen to be the rotor position where the center line of an interpolar space on the rotor is aligned with the center line of a stator pole, but may be some other angle.

In many systems, the phase winding remains connected to the DC bus (or connected intermittently if chopping is employed) until the rotor rotates such that it reaches what is referred to as the "freewheeling angle", $\theta_{FW}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the phase winding is small, and the flux remains substantially constant. The circuit remains in this freewheeling condition until the rotor rotates to an angular position known as the "turn-off angle", $\theta_{OFF}$, (e.g. when the center line of the rotor pole is aligned with that of the stator pole). When the rotor reaches the turn-off angle, both switches 31 and 32 are turned off and the current in phase winding 16 begins to flow through diodes 33 and 34. The diodes 33 and 34 then apply the DC voltage from the DC bus in the opposite sense, causing the magnetic flux in the machine (and therefore the phase current) to decrease.

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling, i.e. switches 31 and 32 are switched on and off simultaneously. FIG. 4(b) shows a typical such single-pulse current waveform where the freewheel angle is zero.

It is well known that the values of turn-on, freewheel and turn-off angles can be predetermined and stored in some suitable format for retrieval by the control system as required, or can be calculated or deduced in real time.

When the phase winding of a switched reluctance machine is energized in the manner described above, the magnetic field set up by the flux in the magnetic circuit gives rise to the circumferential forces which, as described, act to pull the rotor poles into line with the stator poles. This force, acting at the radius of the air gap, develops torque on the shaft. A typical set of torque curves for a switched reluctance machine is shown in FIG. 5. The torque is shown over a complete rotor pole pitch, as the rotor r moves from the position where the center line of an interpolar gap on the rotor r is aligned with the center line of a stator pole s (the "unaligned position"), through the position where the center lines of the rotor and stator poles r and s respectively are aligned (the "aligned position"), to the position where the next interpolar center line is aligned with the center line of the stator poles. The torque curve is periodic with rotor pole pitch, and corresponds to the cyclical variation of inductance of the winding associated with the stator pole.

FIG. 5 shows the torque curves for three currents. As is well-known in the art, the magnitude of torque produced is not linearly related to the current, due to, inter alia, the non-linearity of the magnetic characteristics of the lamination steel. In general terms, the torque at any point is proportional to the rate of change of inductance of the circuit providing the excitation for the magnetic circuit. It follows that the difference between the minimum inductance (i.e. when the poles are unaligned) and the maximum inductance (i.e. when the poles are aligned) will directly affect the amount of torque produced over the rotor cycle. It is generally taught that this difference should be maximized by making the air gap in the aligned position as small as possible (typically less than 0.5 mm in a machine rated at a few kilowatts output) and making the air gap in the unaligned position as large as possible (typically controlled by mechanical strength considerations of the rotor shaft and of the part of the rotor lamination between the poles). FIGS. 6(a) and FIG. 6(b) show typically proportioned stator and rotor laminations in the aligned and unaligned positions, respectively. It will be noted that, as is recommended for such designs, the air gap in the unaligned position (FIG. 6(b)) is large, as a result of keeping the rotor poles broadly the same width at their root as at their tip.

The torque curves in FIG. 5 represent the positive and negative torques developed as the poles approach and leave each other. In a practical drive, some or all of the positive portion of the curve would be used to provide torque in one direction of rotation and some or all of the negative portion of the curve would be used for rotation in the opposite direction. Since the torque varies as a function of angle, the torque resulting from the excitation of all the phases (in turn or simultaneously, depending on the excitation pattern chosen) is not smooth, but contains a ripple component. This can be analyzed, by well-known methods, to represent the torque as a constant level plus a series of harmonic components. While in many applications this ripple component is immaterial, there are applications where the torque ripple can adversely influence the load coupled to the shaft.

There have been many attempts to minimize the torque ripple by altering the excitation pattern of the windings. For example, U.S. Pat. No. 5,319,297, incorporated herein by reference, discloses a method of current shaping to produce smoother torque. However, this and similar methods of excitation control have an impact on the size of switches required in the electronic controller which supplies the excitation, and the increase in switch size that is required can make a major impact on the cost of the drive. Such consequences have been discussed in, for example, "Computer-Optimised Smooth-Torque Current Waveforms for Switched-Reluctance Motors" Lovatt, H. C. & Stephenson, J. M., IEE Proc. Electr. Power Appl., Vol. 144, No. 5, September 1997, pp. 310–316, which is incorporated herein by reference.

In an attempt to avoid the costs associated with excitation control, other methods of smoothing the torque have addressed the machine, rather than the supplied excitation. For example, U.S. Pat. No. 5,619,113, incorporated herein by reference, describes a switched reluctance machine with two stators, displaced relative to each other so as to smooth out the torque ripple, and U.S. Pat. No. 4,647,802, incorporated herein by reference, describes a switched reluctance motor which has saturation deliberately introduced to the pole tips to flatten torque curves and thereby reduce ripple. However, none of these methods have been satisfactory, since they result in a deterioration of the specific output of the machine.

The angular extent of the stator and rotor pole arcs of the machine are two of the design parameters under the control of the designer, though they have bounds set by the number of phases in the machine, the ratio of the numbers of poles in the lamination, the starting requirements of the drive, etc. The rules setting out these bounds can be found in the paper: "Variable-Speed Switched Reluctance Motors", by Lawrenson, P. J., Stephenson, J. M., Blenkinsop, P. T., Corda, J. and Fulton, N. N., IEE Proc., Vol. 127, Pt. B, No. 4, July 1980, pp. 253–265, which is incorporated herein by reference. Several investigators have described methods of selecting the actual values of these arcs and of varying the radial length of the air gap so as to influence the torque ripple. For example, U.S. Pat. No. 5,148,090, incorporated herein by reference, discloses a technique of varying the angular extent of the rotor pole arc over the axial length of the machine, but this is extremely complex mechanically and has not been adopted in practice. U.S. Pat. No. 5,146,127, incorporated herein by reference, discloses a complex method of shaping both the stator and rotor poles over their arcs. While this addresses part of the problem, it has failed to show any overall benefit in producing smooth torque.

What is needed is a machine whose torque curves can be tailored to suit the excitation pattern to be provided by the controller. There is a need to be able to control the harmonic spectrum of the torque curves of the individual phases so that the torque finally produced by the machine is sufficiently smooth for the application. In this way, the cost penalty normally associated with excitation control will be minimized. None of the prior art has presented a satisfactory solution to this problem.

SUMMARY OF THE INVENTION

It is an object of the present invention to address the problem of torque ripple in a switched reluctance machine and to provide a machine which has both reduced torque ripple and a reduced spectrum of harmonic torques.

According to one aspect of the present invention there is provided a set of laminations for a reluctance machine comprising a rotor lamination and a stator lamination, each lamination having a profile defining an array of salient pole pieces extending towards the other lamination, interpolar axes being defined between adjacent pole pieces on each respective lamination, the faces of the respective pole pieces being movable past one another to define a variable air gap between them, and the variation in the air gap being such that the first derivative of the variation of the air gap with the relative position of the rotor and stator laminations is substantially continuous between the interpolar axes on the rotor lamination.

In one form the laminations are for a rotary, as opposed to linear, machine. The pole pieces are movable past one another by rotation about an axis that is common to both the rotor and stator laminations. The junction between two adjacent pole pieces can be abrupt or smooth. Preferably, the said first derivative is continuous in a region about the interpolar axis. Alternatively, the said first derivative can be discontinuous at the interpolar axis.

Thus, in one form the profile of each pole piece of the rotor lamination is convex and the profile of the region about the interpolar axis is concave, the convex portion being of a greater angular extent or linear distance than the concave portion. In an alternative form the profile of the face of the pole piece of the stator lamination is bounded by convex regions to define together a first region, and the profile of the region about the interpolar axis is concave, the first region being of a greater extent than the concave portion. Both forms can be included in the same set of laminations.

The rotor poles may be wider than the stator poles. Alternatively, the stator poles may be wider than the rotor poles. Preferably, the stator or rotor poles are wider than operationally necessary to fulfill a starting requirement of producing torque in the required direction at every angle.

Preferably, the rotor lamination has a profile that has substantially no discontinuities. The stator lamination may have a profile that has substantially no discontinuities.

In one form of the invention, more rotor poles may be provided than stator poles. Six stator poles and eight rotor poles is one possible arrangement. The stator and/or the rotor laminations may be symmetric about their center lines. The stator and/or the rotor laminations may be asymmetric.

According to another aspect of the present invention, there is provided a rotor for a reluctance machine, the rotor comprising a lamination having a profile with substantially no discontinuities. Preferably, the rotor is made up of a stack of the laminations.

According to yet another aspect of the present invention, there is provided a stator for a reluctance machine, the stator comprising a lamination having a profile with substantially no discontinuities. Preferably, the stator is made up of a stack of said laminations. The stator may be symmetric about its center line. The stator may be asymmetric.

The invention also extends to a rotor/stator arrangement comprising stator poles of a width to produce a starting torque at any orientation of the rotor with respect to the stator.

The invention also extends to a reluctance machine including a set of laminations as defined.

BRIEF DESCRIPTION OF THE DRAWINGS

The invention can be put into practice in various ways, some of which will now be described by way of example with reference to the accompanying drawings, in which.

DETAILED DESCRIPTION OF PREFERRED EMBODIMENTS

Figure 7A:
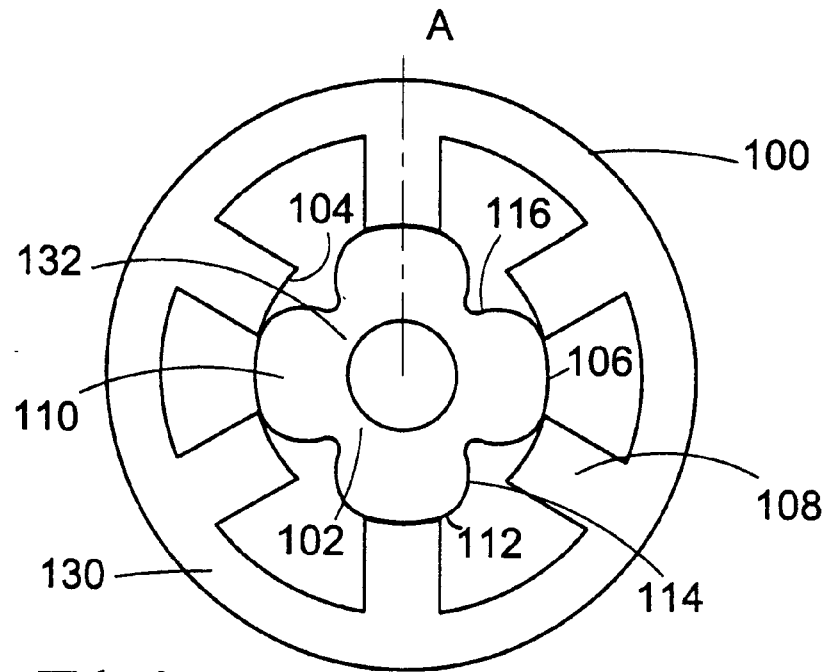
FIGS. 7(a) and (b) show exemplary stator and rotor laminations according to an embodiment of the invention.
Figure 7B:
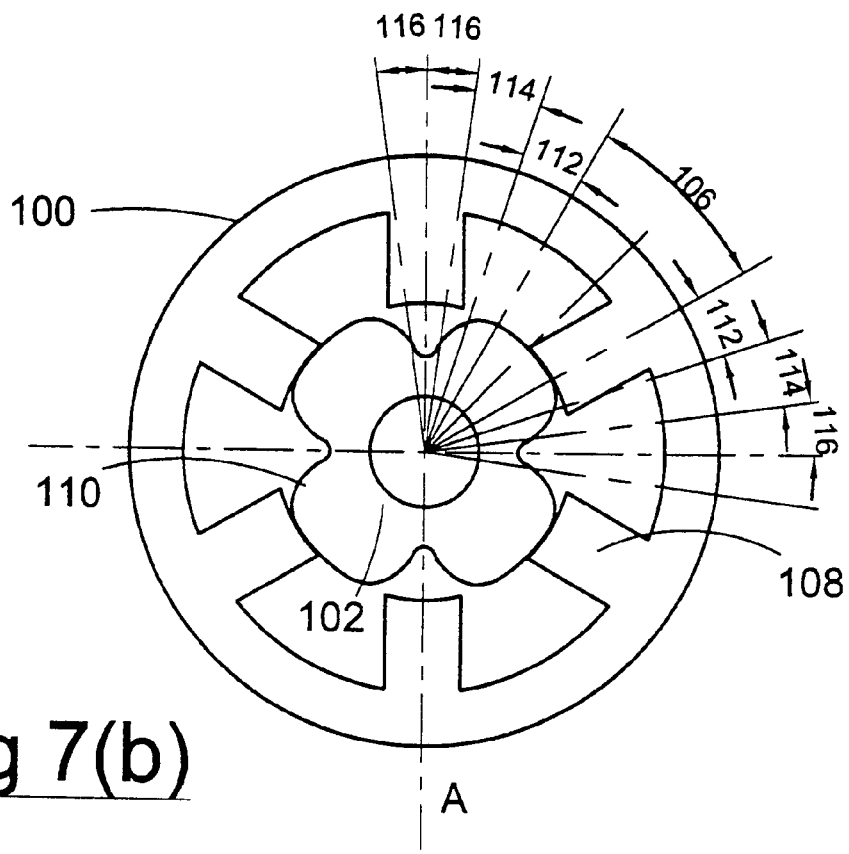

FIGS. 7(a) and 7(b) show a stator lamination 100 and a rotor lamination 102 for a switched reluctance machine with six salient stator poles 108 and four salient rotor poles 110. The stator lamination 100 has a body 130 from which a regular array of stator poles, arranged about an axis, extend towards the rotor lamination. Likewise, the rotor lamination 102 has a body 132 from which a regular array of rotor poles, arranged about the same axis, extend towards the stator lamination. The laminations can be made from electrical sheet steel as is conventional in the art.

Figure 1:
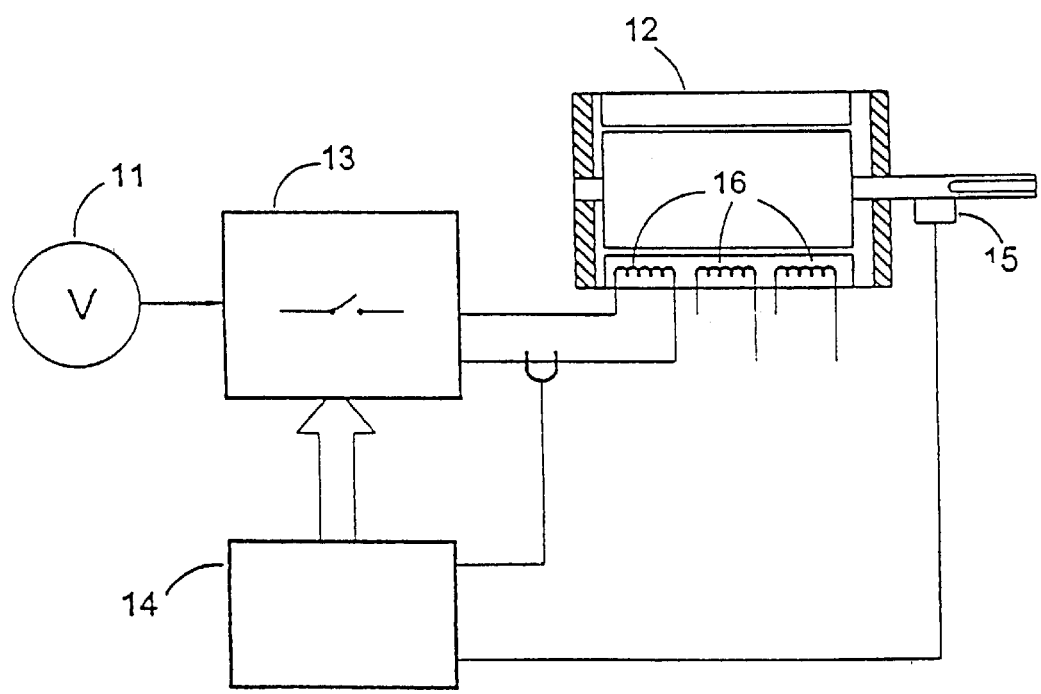
FIG. 1 shows the principal components of a switched reluctance drive system.
Figure 2:
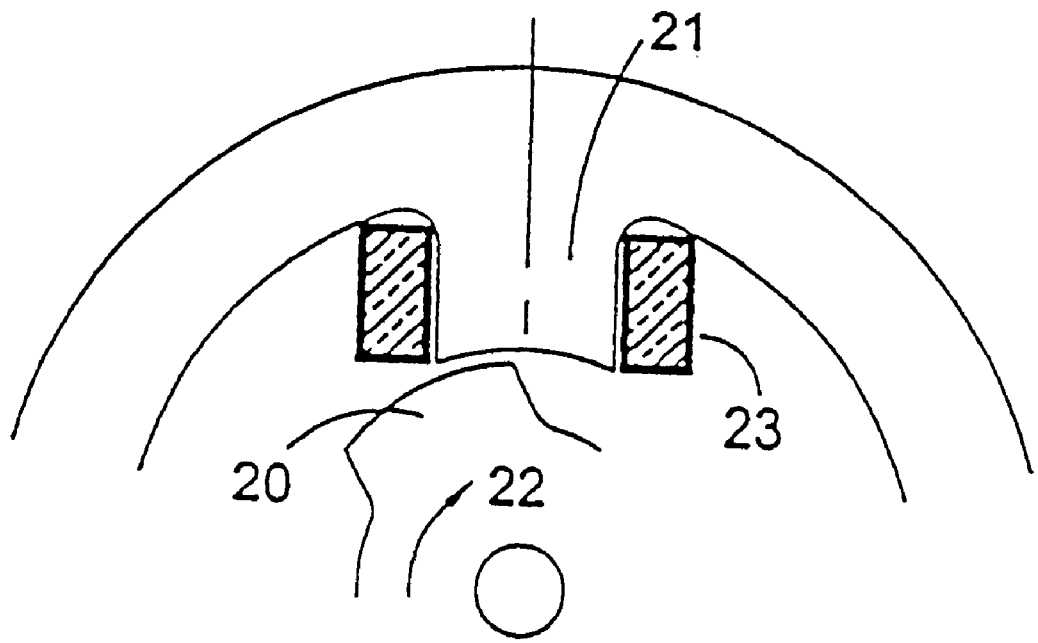
FIG. 2 shows a schematic diagram of a rotor pole approaching a stator pole.
Figure 3:
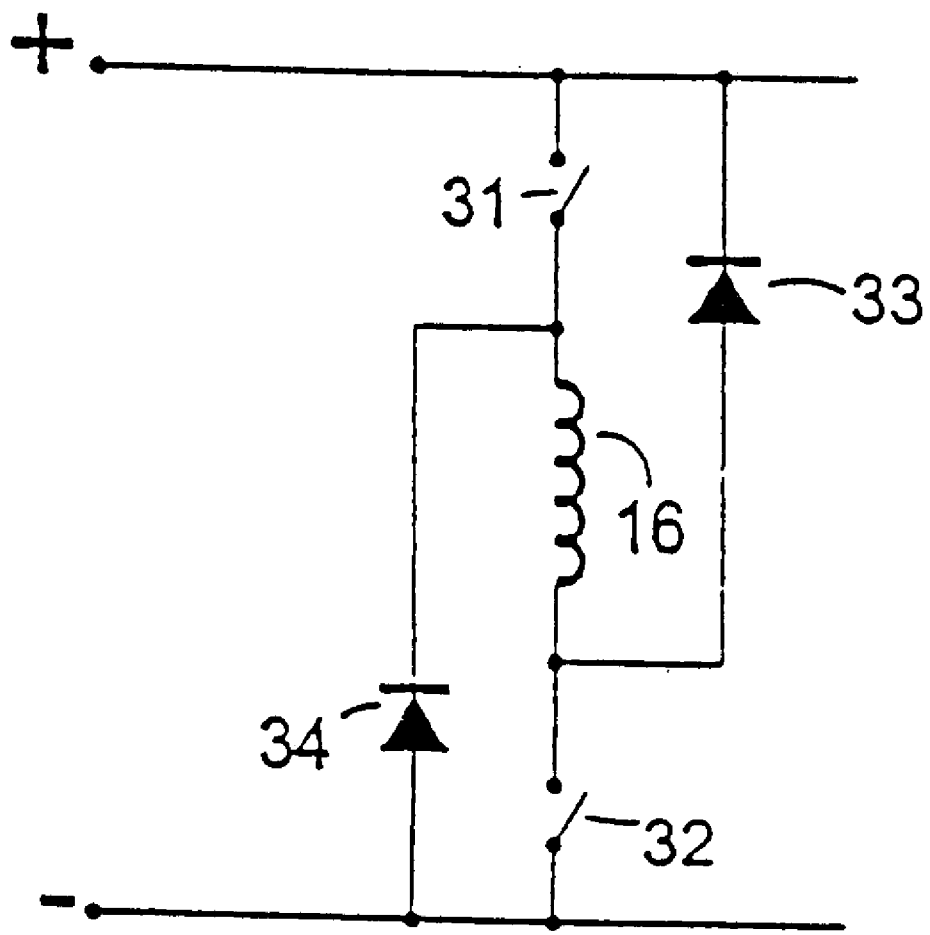
FIG. 3 shows typical switching circuitry in a power converter that controls the energization of the phase windings of the machine of FIG. 1.
Figure 4A:
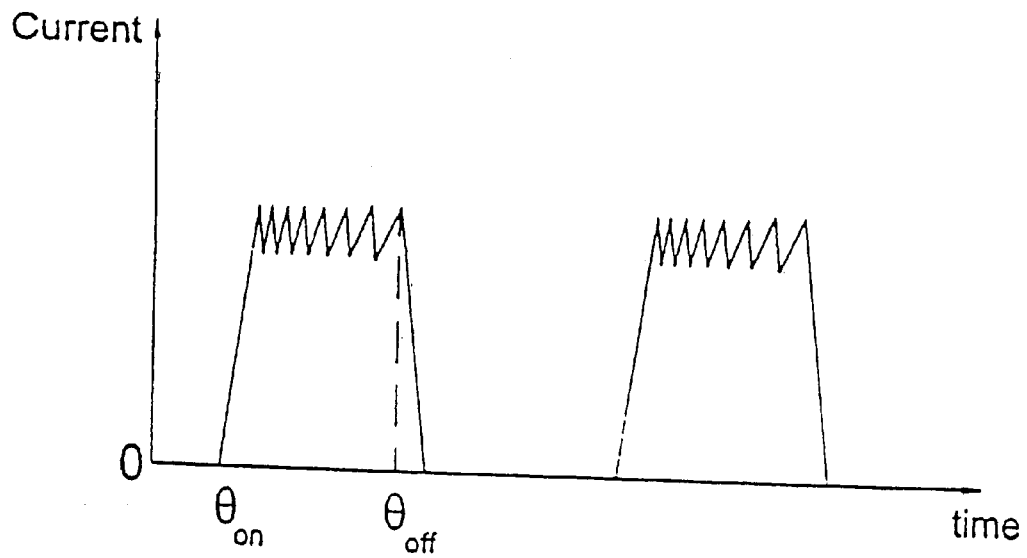
FIGS. 4(a) and 4(b) illustrate typical current waveforms of a switched reluctance drive operating in chopping and single-pulse modes respectively.
Figure 4B:
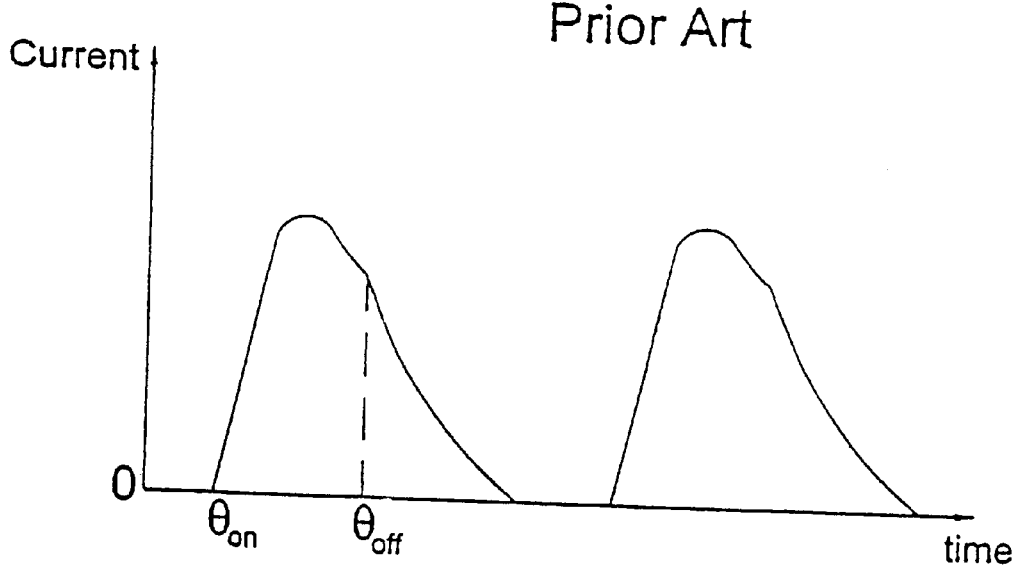
Figure 5:
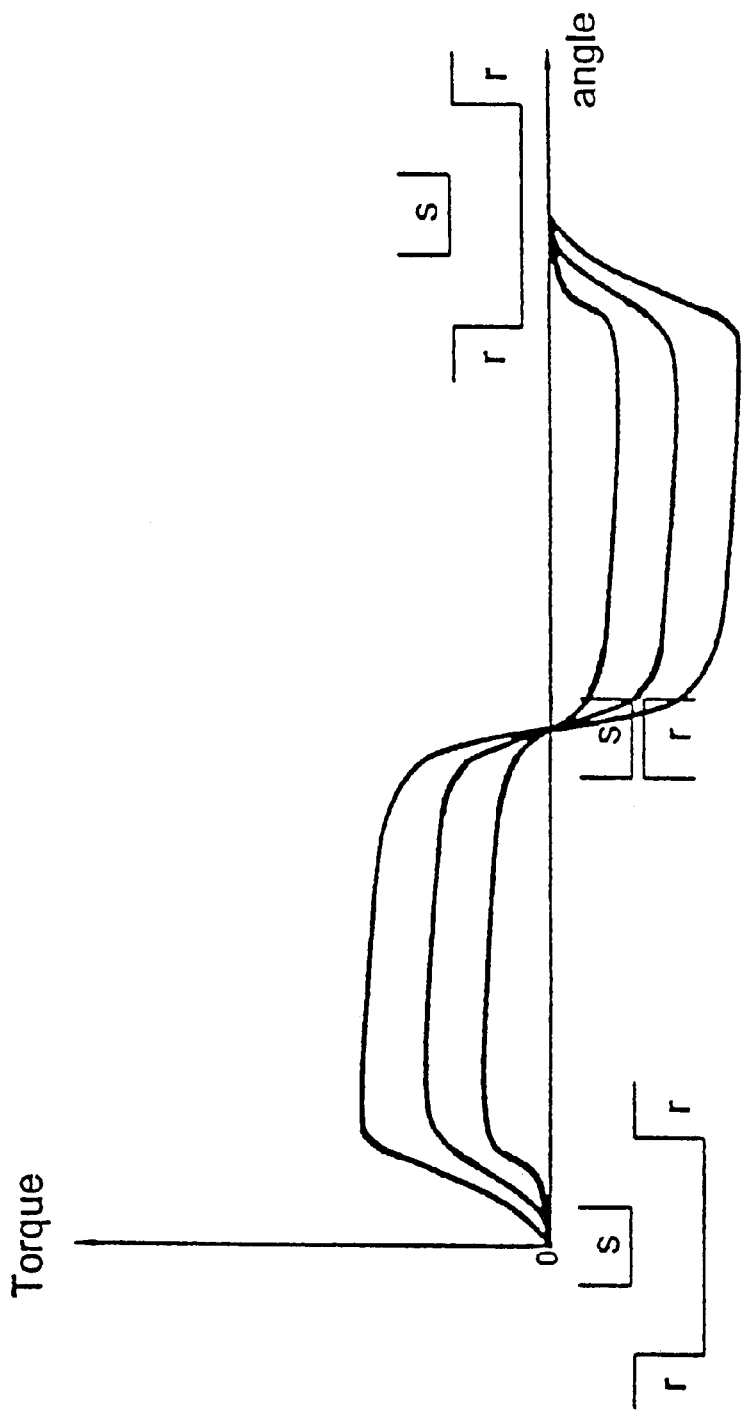
FIG. 5 shows typical curves of torque against rotor angle for three values of phase winding current.

As in a conventional machine, stacks of such laminations are used to form a rotor core pack and a stator core pack. FIGS. 7(a) and (b) can equally well be considered to depict the cross-section of such rotor/stator core packs. These form the magnetic circuit of a switched reluctance machine which is incorporated in the drive system, for example, of FIG. 1. FIG. 7(a) shows a rotor position where the center line of a rotor pole is radially aligned with the center line of a stator pole, i.e. a position in which the inductance of the phase winding around the stator pole would be a maximum. FIG. 7(b) shows the rotor position where the rotor has been rotated by half a rotor pole pitch so that the center line of the interpolar gap on the rotor is radially aligned with the center line of the stator pole, i.e. a position in which the inductance of the phase winding would be a minimum.

It will be understood by the skilled person that the term 'air gap' is intended to describe the portion of the flux path between the stator and the rotor for any position of the rotor. It will also be understood that, as the rotor rotates, the effective length of the air gap varies between a minimum at a position where the rotor and stator pole axes are aligned and a maximum at a position in which a rotor interpole axis is aligned with a stator pole axis.

The stator pole face 104 in the arrangement of FIGS. 7(a) and (b) has a conventional profile, that being an arc centered on the axis of rotation of the rotor. The rotor profile is symmetric about a center line A extending from its axis of rotation. Each rotor pole 110 comprises various portions. The first such portion 106 is a convex pole arc, the center of the arc being coincident with the center of the rotor lamination 102. This portion 106 may be of negligible angular span. Angularly adjacent and on either side of the first portion 106 are convex second portions 112 that are smoothly graded radially inwardly towards the center of the rotor and away from the stator pole face. The grading of the second portions 112 is such that there is no discontinuity with the first portion 106. Angularly adjacent each second portion 112 is a convex third portion 114, which extends from the second portion 112 such that there is no discontinuity. The contours of the third portions 114 in this example are of a radial form. They may be more complex, but in all cases, there is no discontinuity with the second portions 112. Angularly adjacent each third portion 114 is a concave fourth portion 116 that extends towards the main body of the rotor and curves round to blend into an adjacent fourth portion 116 on the adjacent pole 110. Adjacent fourth portions 116 thus define an interpolar region spanning the interpolar axis between the rotor poles. The profile of the fourth portions 116 is such that there is no discontinuity with the third portions 114 or each other. Hence, the overall profile of the rotor lamination has substantially no discontinuities.

Figure 15:
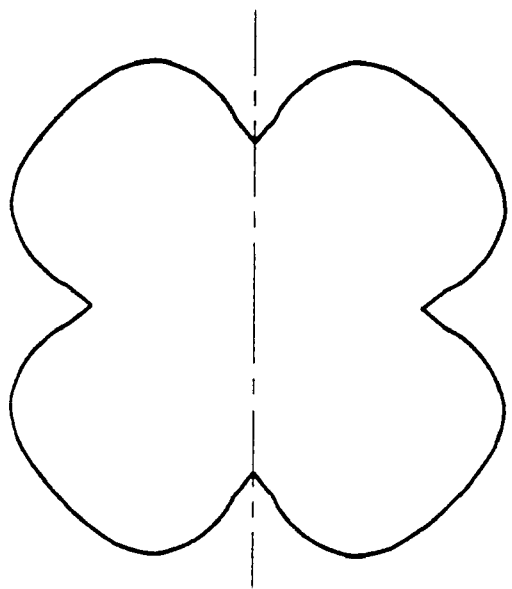
FIG. 15 shows a profile of another form of rotor lamination according to an embodiment of the invention.

In other embodiments, there could be a slight discontinuity between adjacent fourth portions i.e. the "join" between the two poles may not be completely smooth. This will have only a small effect on the air gap profile and may well yield acceptable performance. In a modification of the rotor illustrated in FIGS. 7(a) and (b), the transition between the rotor poles is abrupt (discontinuous), as shown in FIG. 15. The sides of adjacent poles meet at the interpolar axis.

Since the profiles of the rotor poles 110 and the interpole regions effectively blend into each other, a measure of the relative widths can be obtained by considering the "mark" to "space" ratio of lamination material which exists around the circumference of any circle centered on the rotor axis. The width of each rotor pole 110 is much wider than the interpolar region, and is significantly wider than would be recommended by the conventional art, e.g. the paper by Lawrenson et al. cited above. Typically, the pole arcs 106 are wider than necessary to fulfill the starting requirement of producing torque in the required direction at every rotor angle. Also, the interpole region is typically very short, giving a relatively narrow region of low inductance. The combination of these features is such that the variation of air gap, g, between the rotor and the stator laminations is completely smooth with rotor angle, θ, i.e. the first derivative of the function g(θ) is continuous.

Figure 6A:
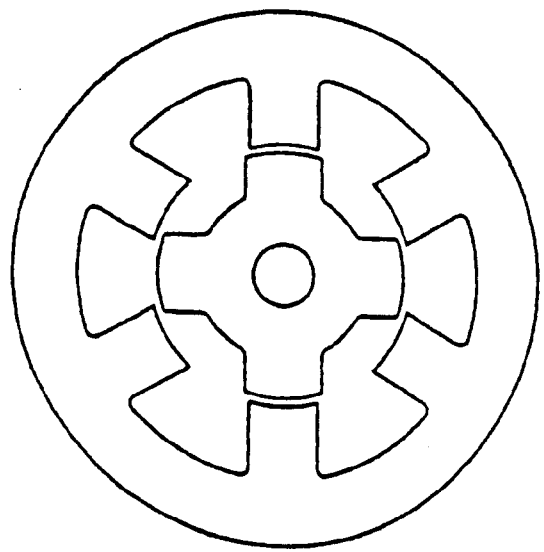
FIG. 6(a) shows a typical pair of prior art rotor and stator laminations in the aligned position.
Figure 6B:
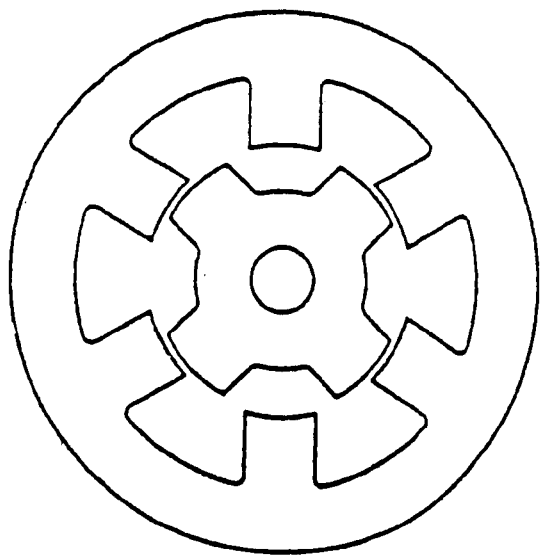
FIG. 6(b) shows the same laminations in the unaligned position.
Figure 8A:
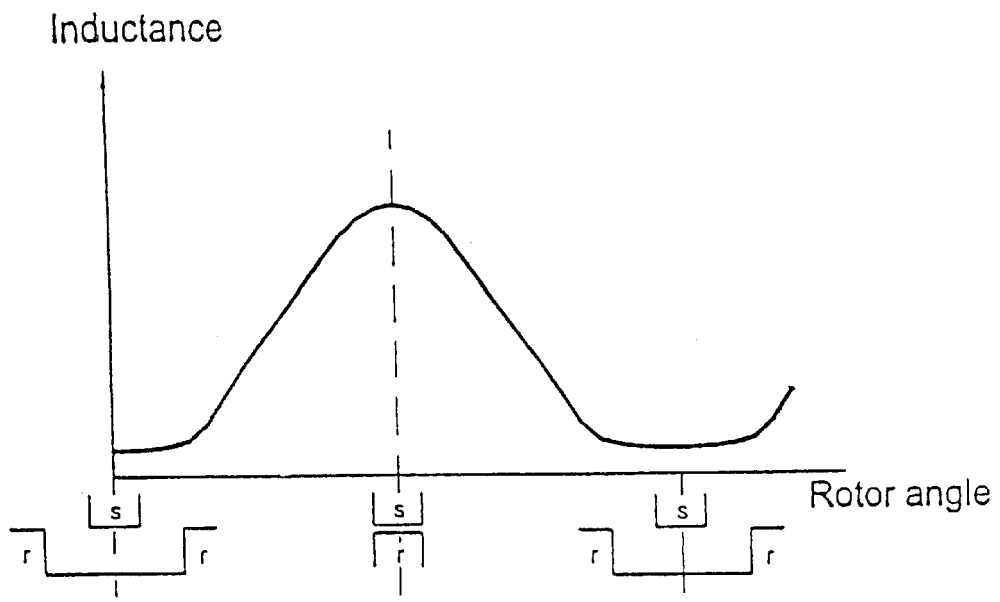
FIG. 8(a) shows an inductance/rotor angle profile for the machine of FIG. 6.

The inductance profiles of the conventional machine shown in FIG. 6 and that of the machine in FIG. 7 are shown in FIGS. 8(a) and (b) respectively. It is seen from FIG. 8(a) that the inductance profile of the conventional machine has a significant angular span at a low value, whereas the profile of the machine of FIG. 7 has a higher and narrower minimum value.

According to conventional teaching, the performance of the machine will be degraded by the raising of the minimum inductance, a result normally to be avoided. However, it will be shown below that there is a non-obvious benefit to accepting the raised value of minimum inductance.

Figure 8B:
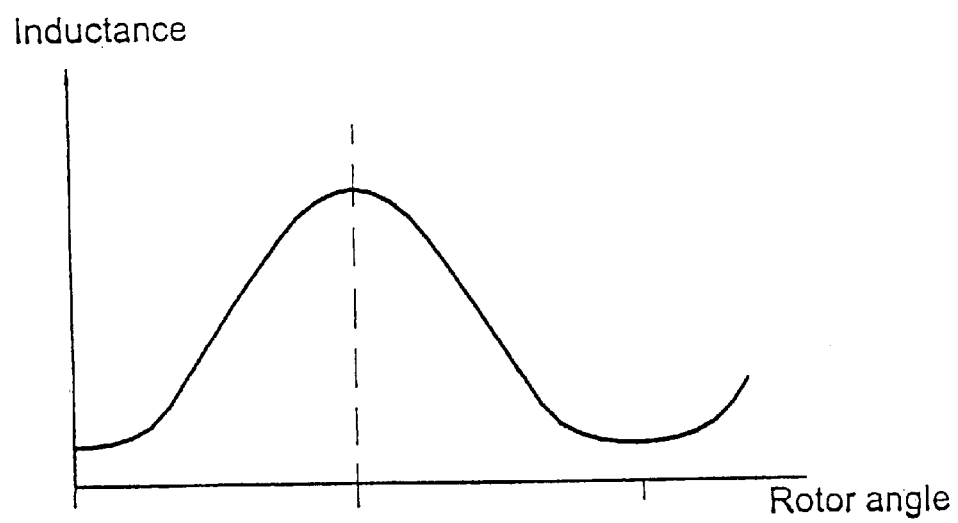
FIG. 8(b) shows an inductance/rotor angle profile for the machine of FIG. 7.
Figure 9:
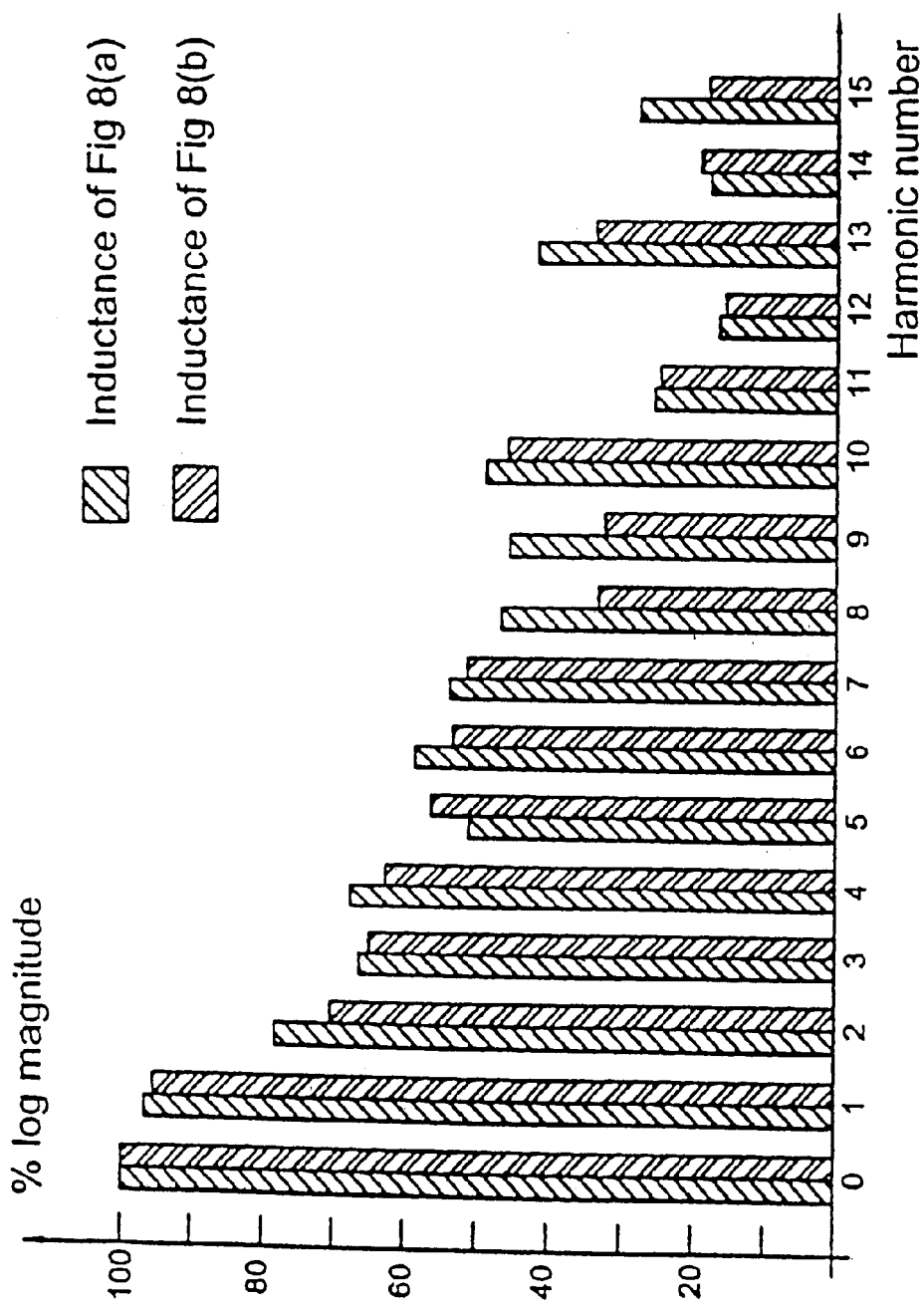
FIG. 9 shows the harmonic content of the inductance profiles of the machines in FIGS. 6 and 7.
Figure 10:
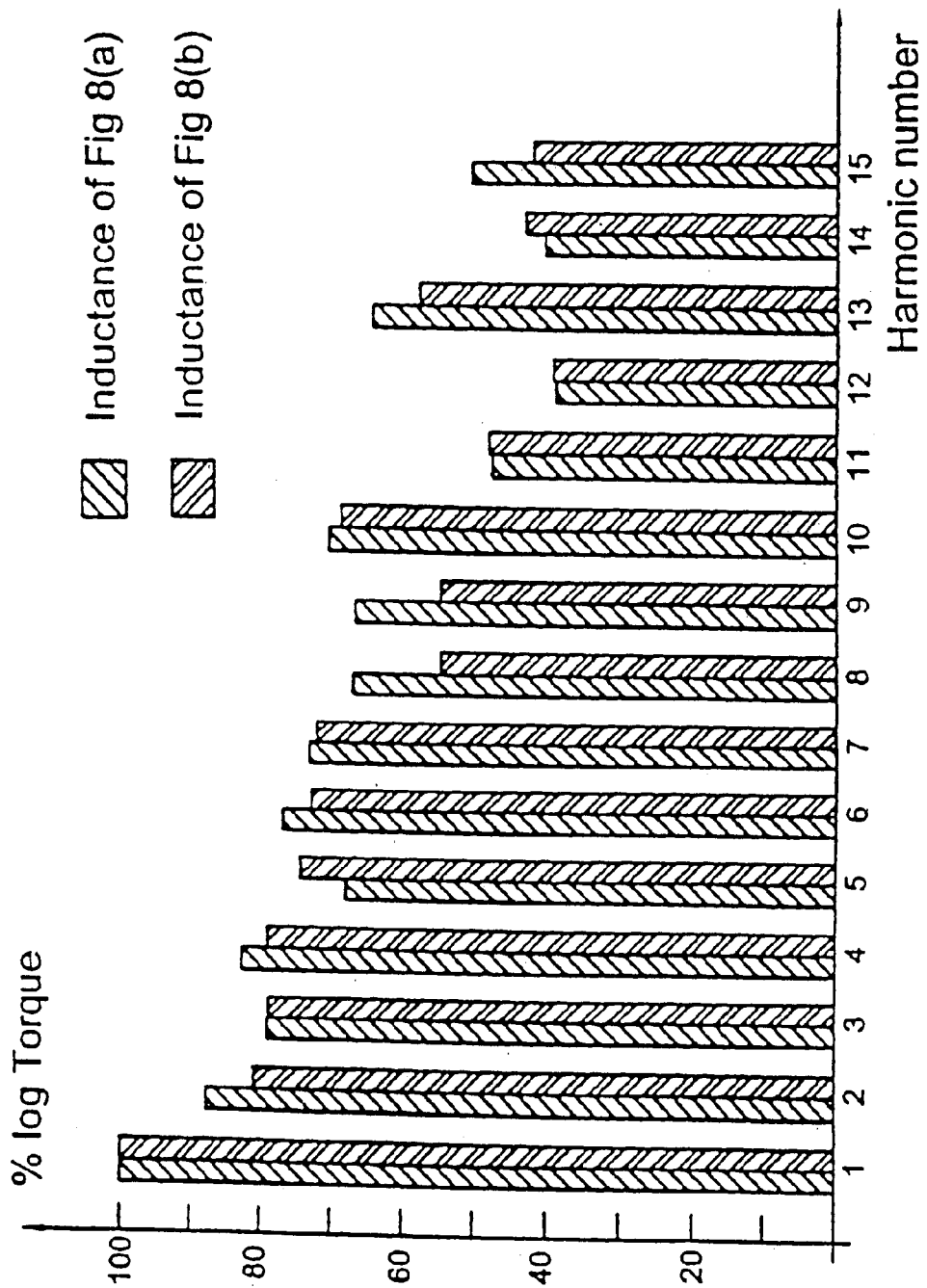
FIG. 10 shows the harmonic content of the torque/angle curves of the machines in FIGS. 6 and 7.

FIG. 9 shows Fourier transforms of the inductance profiles shown in FIG. 8, where, to clarify the differences at higher harmonics, the log of the magnitude of the harmonic components has been plotted. In this particular example, the $8^{th}$ and $9^{th}$ harmonics have been significantly reduced. This leads in turn to reduced harmonics in the torque curves. FIG. 10 shows Fourier transforms for the torque curves corresponding to the inductance curves of FIG. 8 and the resulting reduction in the $8^{th}$ and $9^{th}$ harmonics of torque is clearly seen.

The angular extent of the rotor pole 110 (i.e. the first 106, second 112 and third 114 portions) of FIG. 7 defined between interpolar regions is greater than that of the stator pole 108. The profiling described can also be applied to the stator pole 108, either alone or in combination with that described for the rotor pole. However, if the profiling is applied to the stator, it introduces difficulties in that finding sufficient space requires further consideration to fit and secure the stator winding. The preferred method is therefore to profile the rotor pole 110 only and to keep the stator pole 108 to a more or less conventional profile.

Figure 11:
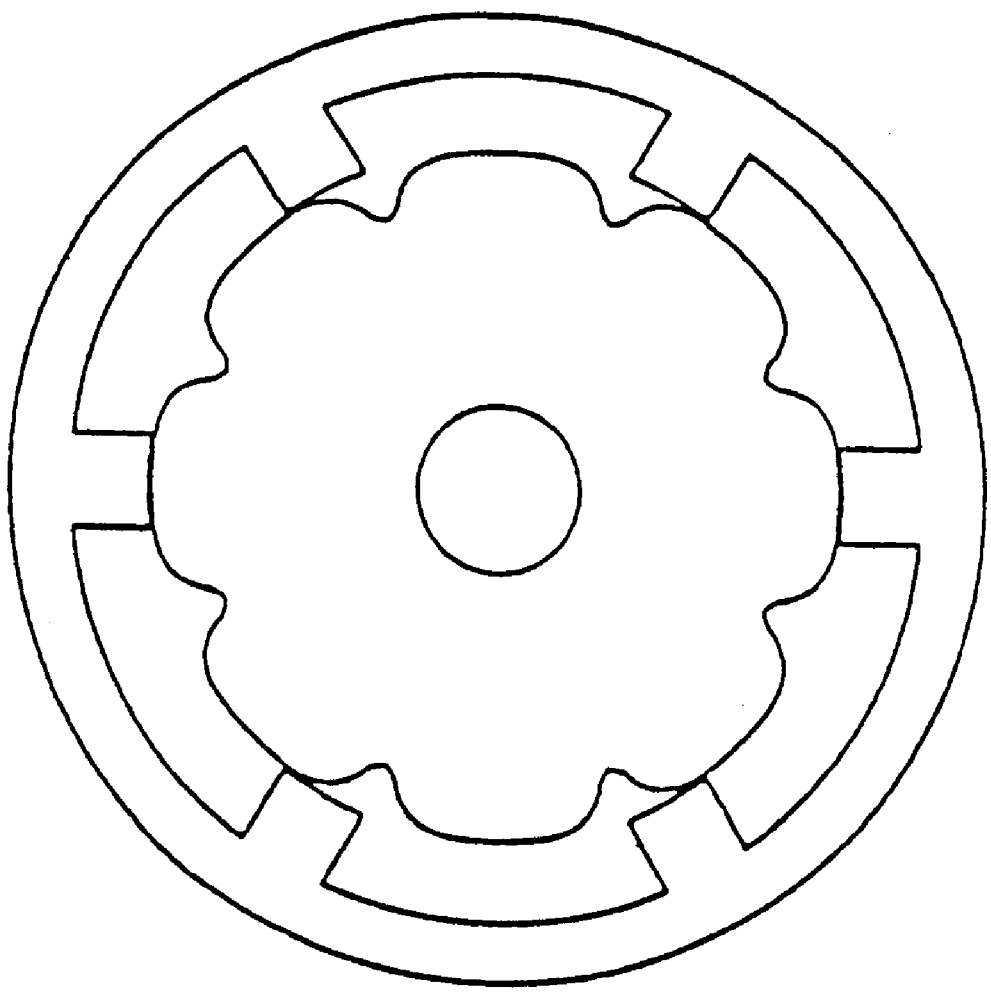
FIG. 11 shows an exemplary rotor lamination according to an embodiment of the invention for a machine with six stator and eight rotor poles.

The conventional wisdom on the design of switched reluctance machines teaches that, although it is possible to have more rotor poles than stator poles, the number of rotor poles should ideally be less than the number of stator poles (see, for example, the Lawrenson paper cited above). It has been found, however, that the profiling discussed above can be efficaciously applied to, for example, a machine with six stator poles and eight rotor poles. An example of such a rotor, profiled according to the invention, is shown in FIG. 11. While the conventional teaching would lead to a conclusion that such a machine would produce poor output, it has been shown that this is not the case.

Figure 12:
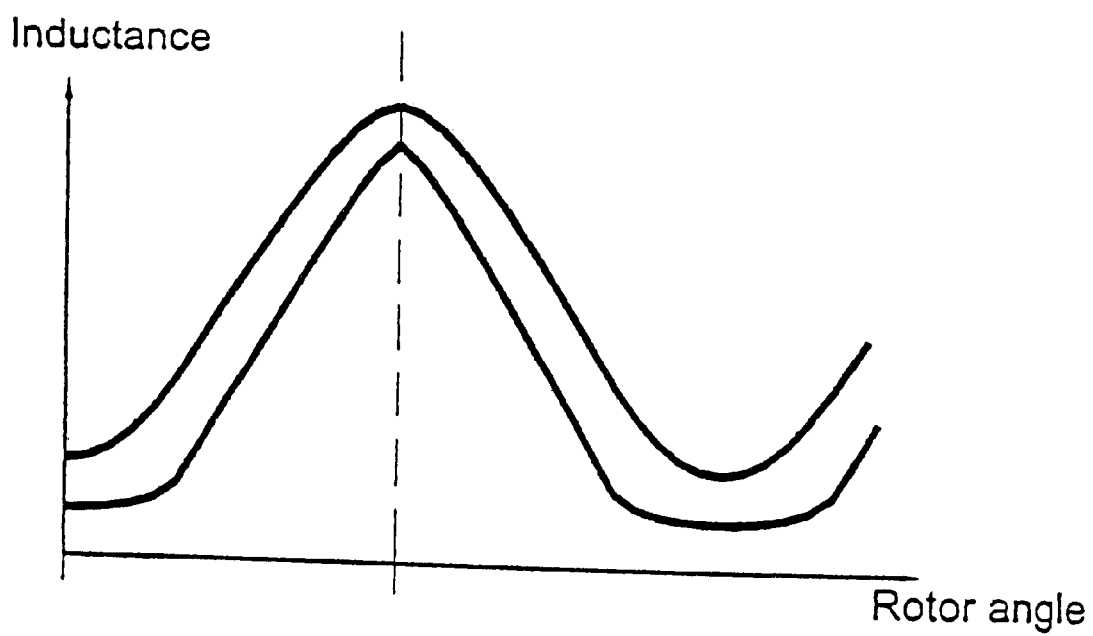
FIG. 12 shows an inductance rotor angle profile of the machine of FIG. 11 compared to the profile of a conventionally designed machine.
Figure 13:
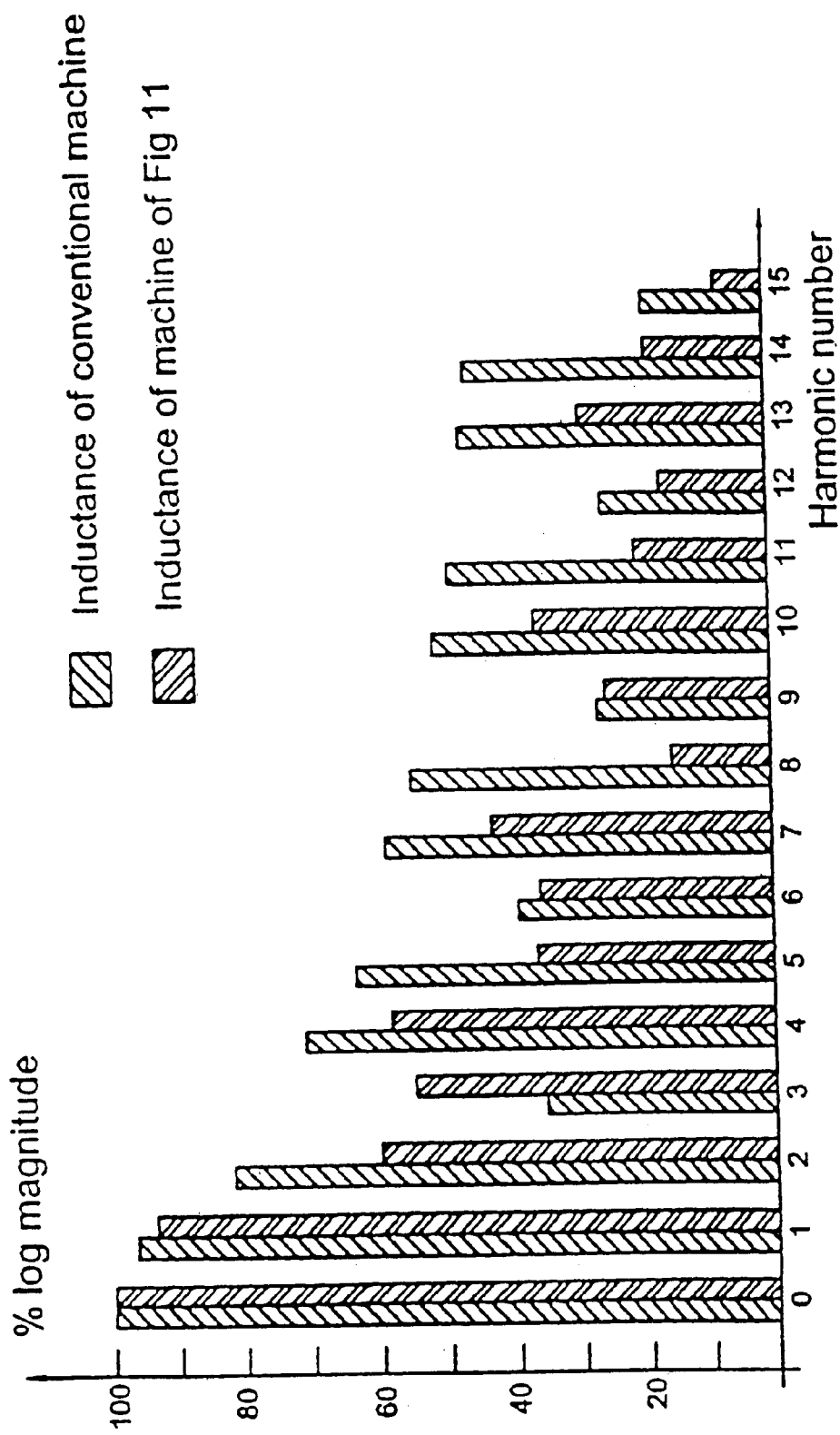
FIG. 13 shows the harmonic content of the inductance profiles of the machines in FIG. 12.

FIG. 12 shows the comparison between the inductance/angle curve of the machine using the rotor profile of FIG. 11 (upper curve) and the curve of a conventionally designed six-stator-pole eight-rotor-pole machine (lower curve). The curves are drawn to the same scale. While the upper curve has a higher minimum inductance (due to the narrow interpolar gap), the lower curve has a lower maximum because of the inferior magnetic circuit in the fully aligned position. FIG. 13 shows a comparison of the harmonic contents of the two machines, plotted in the same way as in FIG. 9. The reduction in the harmonic content, particularly the low-order even harmonics, is clearly seen.

The invention provides a smooth transition in air gap length throughout the complete rotor pole pitch, which the prior art does not do, resulting in an air gap function which has no discontinuities. The air gap defined by the rotor pole profile has the advantage, as the rotor rotates, of avoiding the abrupt transitions in the effective air gap which are present in a conventional rotor/stator arrangement. Thus, it is possible to control not only the average torque produced but also to modify the harmonic content of the torque profile so as to match any excitation scheme available. This not only reduces the magnitude of the torque ripple but offers a way of ensuring that any harmonic components that are particularly troublesome in a particular application can be minimized.

Figure 14:
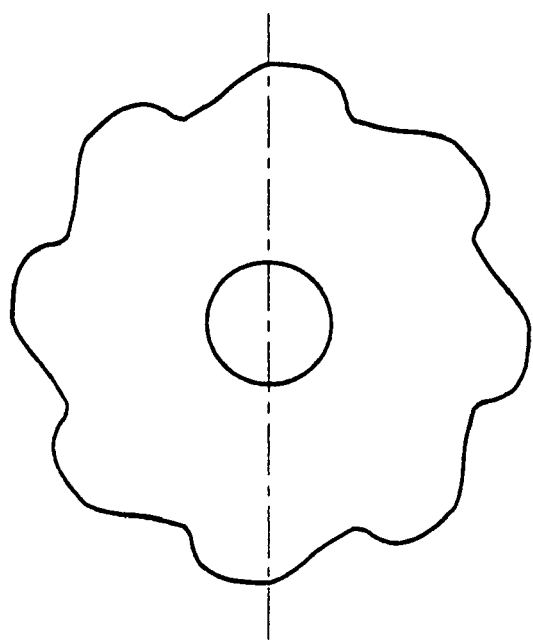
FIG. 14 shows the profile of a rotor lamination according to an embodiment of the invention and having asymmetry about the center line of the rotor pole.

The rotors shown in FIGS. 7 and 11 are symmetrical. This is normal for electrical machines where the performance has to be identical in both directions of rotation. In some applications, however, only one direction of rotation is required and it is conventional to improve the performance in the preferred direction by making the rotor asymmetrical, as shown, for example, for 2-phase machines in the paper by Stephenson and Blake cited above. This invention applies equally to asymmetrical rotors. FIG. 14 shows an example of an asymmetrically profiled rotor in which the invention is embodied. It will be seen that, though the profile of the lamination is asymmetrical about the center line of the rotor pole, it is still continuous and therefore allows the production of a desired torque profile from the machine.

Similarly, the invention could be applied to a linear machine in which the direction of travel is linear. The pole shape of the stator and/or the moving member could be modified to equal effect. The term 'rotor' is also used in the context of linear motors to refer to the moving member. Additionally, while a typical reluctance machine has a rotor arranged to rotate within a stator, the invention is also applicable to an 'inverted' machine in which the rotor rotates around or moves along the outside of the stator. In this arrangement the stator poles extend radially outwardly and the rotor poles extend radially inwardly. Thus, the skilled person will appreciate that variation of the disclosed arrangements are possible without departing from the invention. Accordingly, the above description of several embodiments is made by way of example and not for the purposes of limitation. The present invention is intended to be limited only by the spirit and scope of the following claims.

What is claimed is:

1. A switched reluctance motor having a torque output, the reluctance motor comprising a rotor defining rotor poles, a stator defining stator poles, at least one phase winding arranged in relation to the stator for excitation of the stator poles, a voltage source, switch means electrically connected between the voltage source and the at least one phase winding, control means operable to time actuation of the switch means to cause a current to flow in the at least one phase winding to excite the stator poles, the rotor and stator each comprising a stack of laminations, each of said laminations having a profile defining an array of salient pole pieces, said rotor lamination pole pieces and said stator lamination pole pieces extending one toward another, interpolar axes being defined between adjacent ones of said pole pieces on each of said laminations, faces of the pole pieces being movable past one another to define a variable air gap between them, and variation in the air gap being such that a first derivative of the variation of the air gap with respect to rotor angle is substantially continuous between adjacent ones of said interpolar axes of the rotor lamination, the pole pieces thus being constructed to smooth the torque output of the reluctance motor as the rotor moves relative to the stator, the structure of the pole pieces reducing torque ripple in the torque output of the reluctance motor.

2. A motor as claimed in claim 1, wherein the pole pieces are movable past one another by rotation about an axis which is common to both the rotor and stator laminations.

3. A motor as claimed in claim 1, in which said first derivative is continuous in a region about each interpolar axis.

4. A motor as claimed in claim 3, in which a profile of a portion of each of said pole pieces of the rotor lamination is convex and a profile of a region about each of said interpolar axes is concave, the convex portion being of a greater extent than the concave region.

5. A motor as claimed in claim 3, in which a profile of a face of each of said pole pieces of the stator lamination is bounded by convex regions to define together a first region, and a profile of a region about each of said interpolar axes is concave, the first region being of a greater extent than the concave portion.

6. A motor as claimed in claim 1, in which said first derivative is discontinuous at the interpolar axes.

7. A motor as claimed in claim 1, wherein the rotor pole pieces are wider than the stator pole pieces.

8. A motor as claimed in claim 1, wherein the stator pole pieces are wider than the rotor pole pieces.

9. A motor as claimed in claim 1, wherein the rotor lamination has a profile adjacent the air gap that has substantially no discontinuities.

10. A motor as claimed in claim 1, wherein the stator lamination has a profile adjacent the air gap that has substantially no discontinuities.

11. A motor as claimed in claim 1, wherein the rotor pole pieces are greater in number than the stator pole pieces.

12. A motor as claimed in claim 11, wherein the stator has six said salient pole pieces and the rotor has eight said salient pole pieces.

13. A motor as claimed in claim 1, wherein the stator lamination and/or the rotor lamination is or are each symmetrical about a center line thereof.

14. A motor as claimed in claim 1, wherein the rotor lamination is asymmetrical about a center line thereof.

15. A motor as claimed in claim 1, wherein the rotor pole pieces are wider than the stator pole pieces; further wherein the rotor pole pieces are of a width to produce a starting torque at any orientation of the rotor with respect to the stator.

16. A motor claimed in claim 1, wherein the stator pole pieces are wider than the rotor pole pieces; further wherein the stator pole pieces are of a width to produce a starting torque at any orientation of the rotor with respect to the stator.

17. A motor as claimed in claim 1, wherein the first derivative of the variation of the air gap is substantially continuous between adjacent ones of said interpolar axes of the rotor lamination to smooth torque ripple of the reluctance motor.

18. A motor as claimed in claim 1, wherein the structure of the pole pieces causes the torque output of the reluctance motor to remain generally constant as the rotor moves relative to the stator.

19. A switched reluctance generator having an electrical output, the reluctance generator comprising a rotor defining rotor poles, a stator defining stator poles, at least one phase winding arranged in relation to the stator for excitation of the stator poles, a voltage source, switch means electrically connected between the voltage source and the at least one phase winding, control means operable to time actuation of the switch means to cause a current to flow in the at least one phase winding to excite the stator poles, the rotor and stator each comprising a stack of laminations, each of said laminations having a profile defining an array of salient pole pieces, said rotor lamination pole pieces and said stator lamination pole pieces extending one toward another, interpolar axes being defined between adjacent ones of said pole pieces on each of said laminations, faces of the pole pieces being movable past one another to define a variable air gap between them, and variation in the air gap being such that a first derivative of the variation of the air gap with respect to rotor angle is substantially continuous between adjacent ones of said interpolar axes of the rotor lamination, the pole pieces thus being constructed to smooth the electrical output of the reluctance generator as the rotor moves relative to the stator, the structure of the pole pieces reducing ripple in the electrical output of the reluctance generator.

20. A generator as claimed in claim 19, wherein the structure of the pole pieces causes the output of the reluctance generator to remain generally constant as the rotor moves relative to the stator.

* * * * *

UNITED STATES PATENT AND TRADEMARK OFFICE
CERTIFICATE OF CORRECTION

PATENT NO     : 6,093,993
DATED         : July 25, 2000
INVENTOR(S)   : McClelland It is certified that error appears in the above-identified patent and that said Letters Patent are hereby corrected as shown below:

On the first page of the above mentioned patent the assignee name should appear as –Switched Reluctance Drives Limited– instead of "Switched Relutance Drives Limited".

Signed and Sealed this

Tenth Day of April, 2001

*Attest:*

NICHOLAS P. GODICI

*Attesting Officer*     Acting Director of the United States Patent and Trademark Office